(12) United States Patent
Schafer et al.

(10) Patent No.: US 12,037,111 B2
(45) Date of Patent: Jul. 16, 2024

(54) QUAD TILT ROTOR UNMANNED AIRCRAFT

(71) Applicant: Bell Textron Inc., Fort Worth, TX (US)

(72) Inventors: Steven R. Schafer, Fort Worth, TX (US); Steven R. Ivans, Ponder, TX (US)

(73) Assignee: Textron Innovations Inc., Providence, RI (US)

( * ) Notice: Subject to any disclaimer, the term of this patent is extended or adjusted under 35 U.S.C. 154(b) by 48 days.

(21) Appl. No.: 17/477,180

(22) Filed: Sep. 16, 2021

(65) Prior Publication Data
US 2023/0077891 A1 Mar. 16, 2023

(51) Int. Cl.
*B64C 29/00* (2006.01)
*B64C 1/30* (2006.01)
*B64C 3/56* (2006.01)

(52) U.S. Cl.
CPC ............ *B64C 29/0033* (2013.01); *B64C 1/30* (2013.01); *B64C 3/56* (2013.01); *B64C 2211/00* (2013.01)

(58) Field of Classification Search
CPC ....... B64C 29/0033; B64C 39/04; B64C 1/30; B64C 3/56; B64C 2211/00; B64U 80/50; B64U 80/70
See application file for complete search history.

(56) References Cited

U.S. PATENT DOCUMENTS

| | | | | |
|---|---|---|---|---|
| 3,174,712 A | * | 3/1965 | Ricard | B64C 1/1415 89/1.51 |
| 4,040,334 A | * | 8/1977 | Smethers, Jr. | F41F 3/06 89/1.804 |
| 11,597,516 B1 | * | 3/2023 | Klinkmueller | B64U 80/40 |
| 2006/0091258 A1 | * | 5/2006 | Chiu | B64C 39/024 244/119 |
| 2021/0047029 A1 | * | 2/2021 | Stanney | B64C 3/56 |
| 2021/0129972 A1 | * | 5/2021 | Sankrithi | B65D 88/14 |
| 2021/0253234 A1 | * | 8/2021 | Tao | B64C 29/0025 |

FOREIGN PATENT DOCUMENTS

CN 109515706 * 3/2019

* cited by examiner

*Primary Examiner* — Richard Green
*Assistant Examiner* — Ashesh Dangol
(74) *Attorney, Agent, or Firm* — Frost Brown Todd LLP

(57) ABSTRACT

An aircraft is described with both VTOL (vertical takeoff and landing) capabilities and convention airplane capabilities. A preferred embodiment comprises a fuselage and fixed wing, with one boom on either side of the fuselage. Each boom comprises a tilt rotor on a fore end and a fixed rotor on the aft end. Both rotors can be directed vertically for VTOL capability. During cruise the tilt rotors can be directed forward for thrust and the fixed rotors can be stopped and directed along the boom axis, minimizing drag. The described embodiments have advantages in weight savings and maneuverability compared to other VTOL aircraft.

15 Claims, 11 Drawing Sheets

QUAD TILT ROTOR UNMANNED AIRCRAFT

TECHNICAL FIELD

The present disclosure is directed to tilt rotor aircraft.

BACKGROUND OF THE INVENTION

Tilt rotor aircraft can be very useful in the aerospace industry. Their ability for vertical takeoff and landing means that long runways are not necessary. This allows such aircraft to access landing spots that are unavailable to standard airplanes. As drones become more and more popular and legally approved, there will be opportunities to use tilt rotor aircraft for both passenger and drone applications.

BRIEF SUMMARY OF THE INVENTION

One embodiment under the present disclosure comprises an aircraft, the aircraft comprising a fuselage; a fixed wing extending across the fuselage; and two booms, one on each side of the fuselage, each of the two booms comprising; a tilt rotor on a fore end, the tilt rotor configured to be moveable between a generally vertical position for providing lift and a generally horizontal position for providing propulsion; and a fixed rotor on an aft end configured to provide lift for vertical takeoff and landing, the fixed rotor comprising one or more blades and the fixed rotor configured to orient the one or more blades along a boom axis during forward flight.

Another embodiment under the present disclosure comprises a system for transporting aircraft, comprising: one or more aircraft, each aircraft comprising; a fuselage; a fixed wing extending across the fuselage; and two booms, one on each side of the fuselage, each of the two booms comprising; a tilt rotor on a fore end, the tilt rotor configured to be moveable between a generally vertical position for providing lift and a generally horizontal position for providing propulsion; and a fixed rotor located aft of the tilt rotor and configured to provide lift for vertical takeoff and landing, the fixed rotor comprising one or more blades and the fixed rotor configured to orient the one or more blades along a boom axis during forward flight; and a container configured to receive the one or more aircraft and to hold the one or more aircraft in place during transport.

Another embodiment under the present disclosure comprises a method of transporting aircraft comprising: provide one or more aircraft, each aircraft comprising; a fuselage; a fixed wing extending across the fuselage; and two booms, one on each side of the fuselage, each of the two booms comprising; a tilt rotor on a fore end, the tilt rotor configured to be moveable between a generally vertical position for providing lift and a generally horizontal position for providing propulsion; and a fixed rotor located aft of the tilt rotor and configured to provide lift for vertical takeoff and landing, the fixed rotor comprising one or more blades and the fixed rotor configured to orient the one or more blades along a boom axis during forward flight; provide a container configured to receive, hold and protect the one or more aircraft; break down each of the one or more aircraft to form a fuselage portion and an extension portion; secure the fuselage portion and the extension portion in the container; and transport the container to a chosen location.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

There are a number of single and multi-rotor configurations for aircraft. Quad rotors are simple, but lack significant speed, range, and endurance. Single rotor concepts or tandem helicopters typically offer higher speeds and payload capabilities than quads, but still suffer from lower range and speed than fixed wing aircraft. Fixed wing aircraft are fast and efficient, but require runway and airfield infrastructure to operate. Tilt rotors offer a compromise between rotor-borne designs and fixed wing aircraft, offering vertical takeoff capabilities with speed and range greater than a typical rotorcraft but lower than a fixed wing aircraft. The tilt rotor does have distinct challenges in weight, typically due to heavy conversion systems, cross-shafting between engines the length of the wing, and heavy transmissions.

Figure 1:
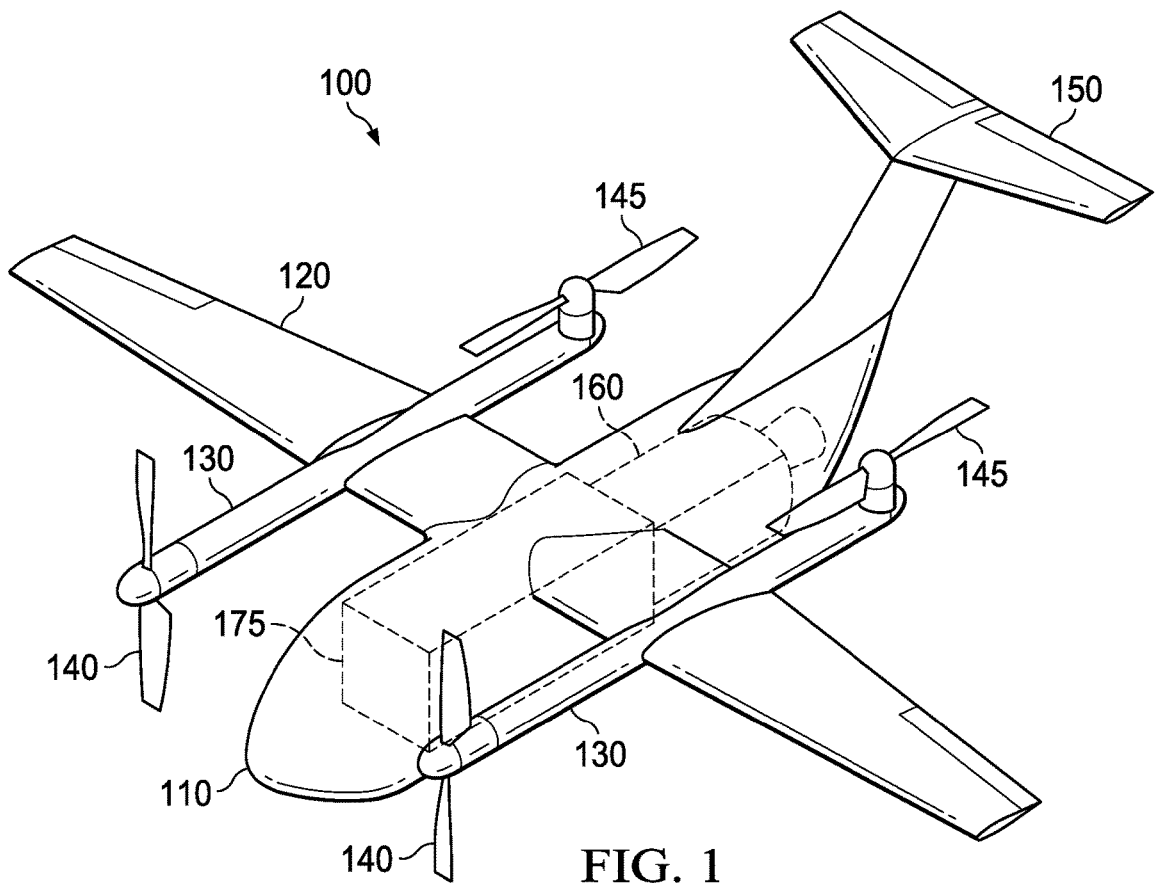
FIG. 1 is a diagram of an aircraft embodiment under the present disclosure.

Referring now to FIG. 1, an embodiment of a quad tilt rotor aircraft 100 under the present disclosure can be seen.

Aircraft 100 can comprise a drone or a passenger aircraft. The embodiment shown is a payload drone. Aircraft 100 comprises a fuselage 110, wing 120, T-tail empennage 150, and booms 130. Booms 130 each comprise a fixed (vertical) rotor 145 and a tilt rotor 140. During takeoff and landing both the fixed rotors 145 and tilt rotors 140 can be directed generally vertically. Once airborne, the tilt rotors can tilt forwards and provide propulsion. Once the aircraft 100 is going fast enough, fixed rotors 145 can stop spinning such that their blades are at rest and at least generally parallel and in line with booms 130. This will minimize drag during cruise. Fuselage 110 can house payload 175 and motors 160. In this embodiment, placing the motors (hybrid, gas, and/or electric), aft of the payload can help balance the weight of the aircraft, in addition to allowing the payload to be place near or on the belly-gap for easier jettisoning. The empennage 150 can be elevated to provide advantages by keeping horizontal surfaces out of aft propeller wash, thus minimizing adverse effects during flight and transitions between vertical and forward flight.

Figure 2:
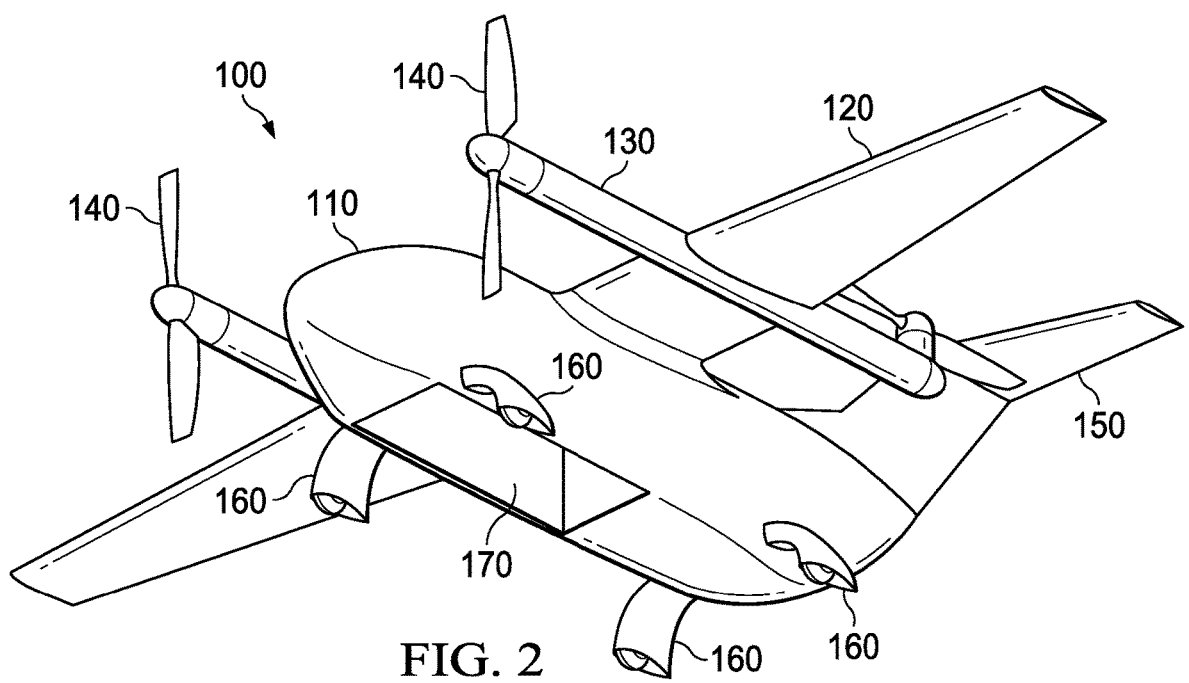
FIG. 2 is a diagram of an aircraft embodiment under the present disclosure.

FIG. 2 shows another view of aircraft 100 from below. Fuselage 110, wing 120, empennage 150, booms 130, and tilt rotors 140 can be seen. In addition, this view shows belly-gap 170, and landing gear/wheels 160. Landing gear 160 can be fixed or retractable. Belly-gap 170 can be used for the storage and jettisoning of payload. Payload can be loaded with bay rails. For instance, a payload can have loops, rings, metal tubes, or another apparatus that can receive a plurality of poles or rails that are attached or connected to the interior of the fuselage and above or near the belly-gap 170. Removing, or otherwise detaching the poles from the payload can allow the payload to fall out of the belly-gap and be delivered to a chosen location. Payload can be dropped from the sky during flight, or on the ground once landed. An optional drag curtain (not shown) can comprise a retractable curtain that can be placed across the belly-gap after (or before) dropping a payload. Covering the belly-gap 170 when not needed can minimize the aerodynamic drag created by a large opening on the bottom of an aircraft. In some embodiments, where lighter weight is prioritized over aerodynamic concerns, it may be preferable to have a belly-gap and avoid the weight of a curtain or other type of cover or doors and accompanying components.

Figure 3A:
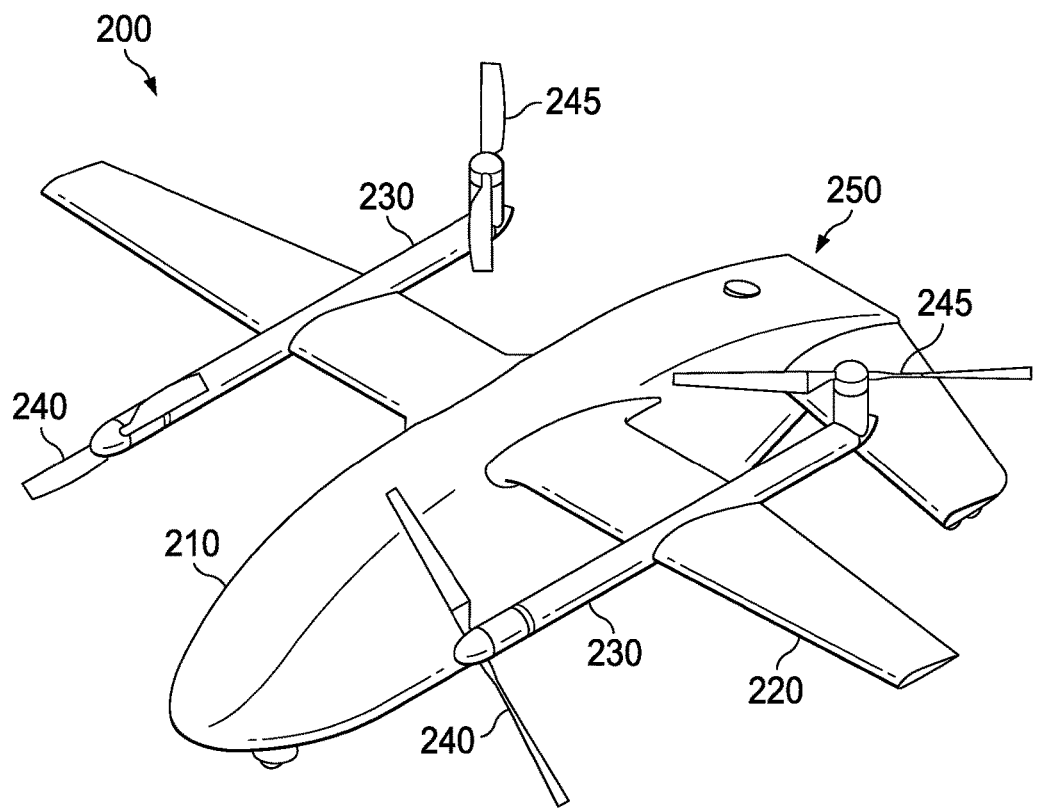
FIGS. 3A-3C are diagrams of an aircraft embodiment under the present disclosure.
Figure 3B:
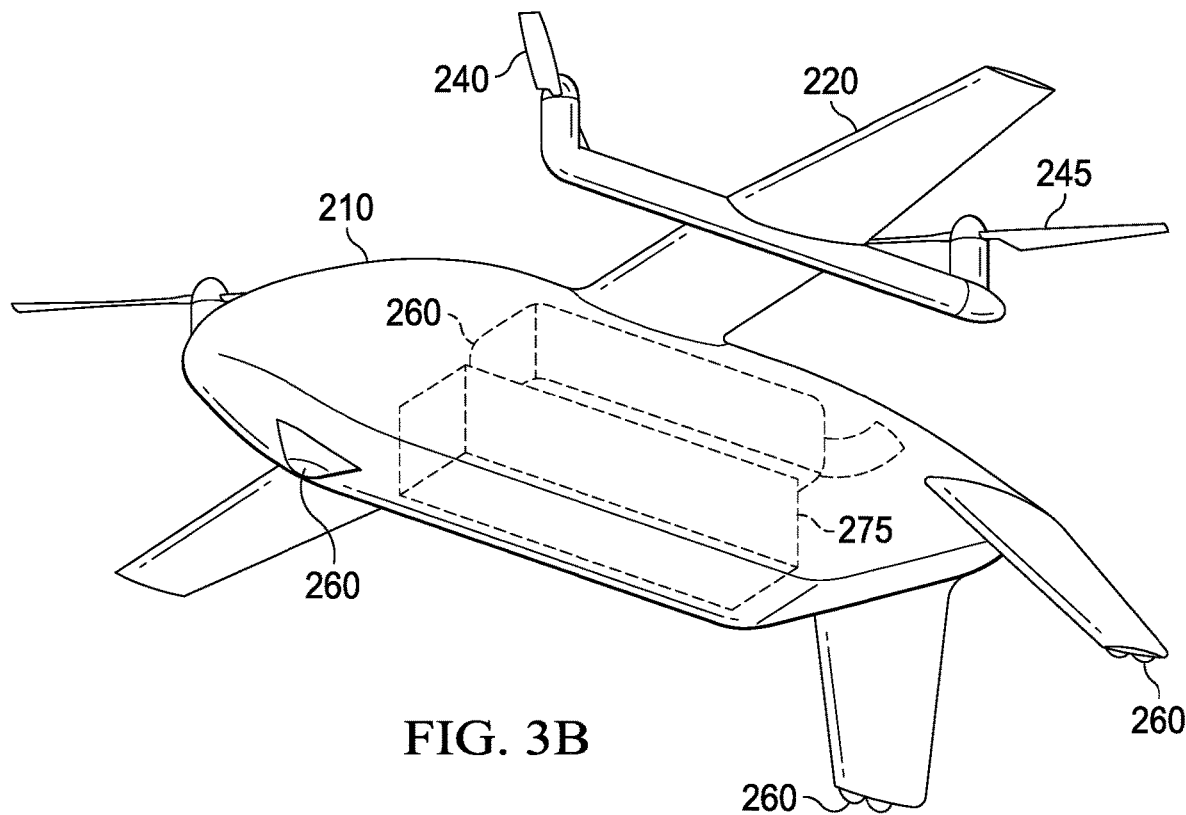
Figure 3C:
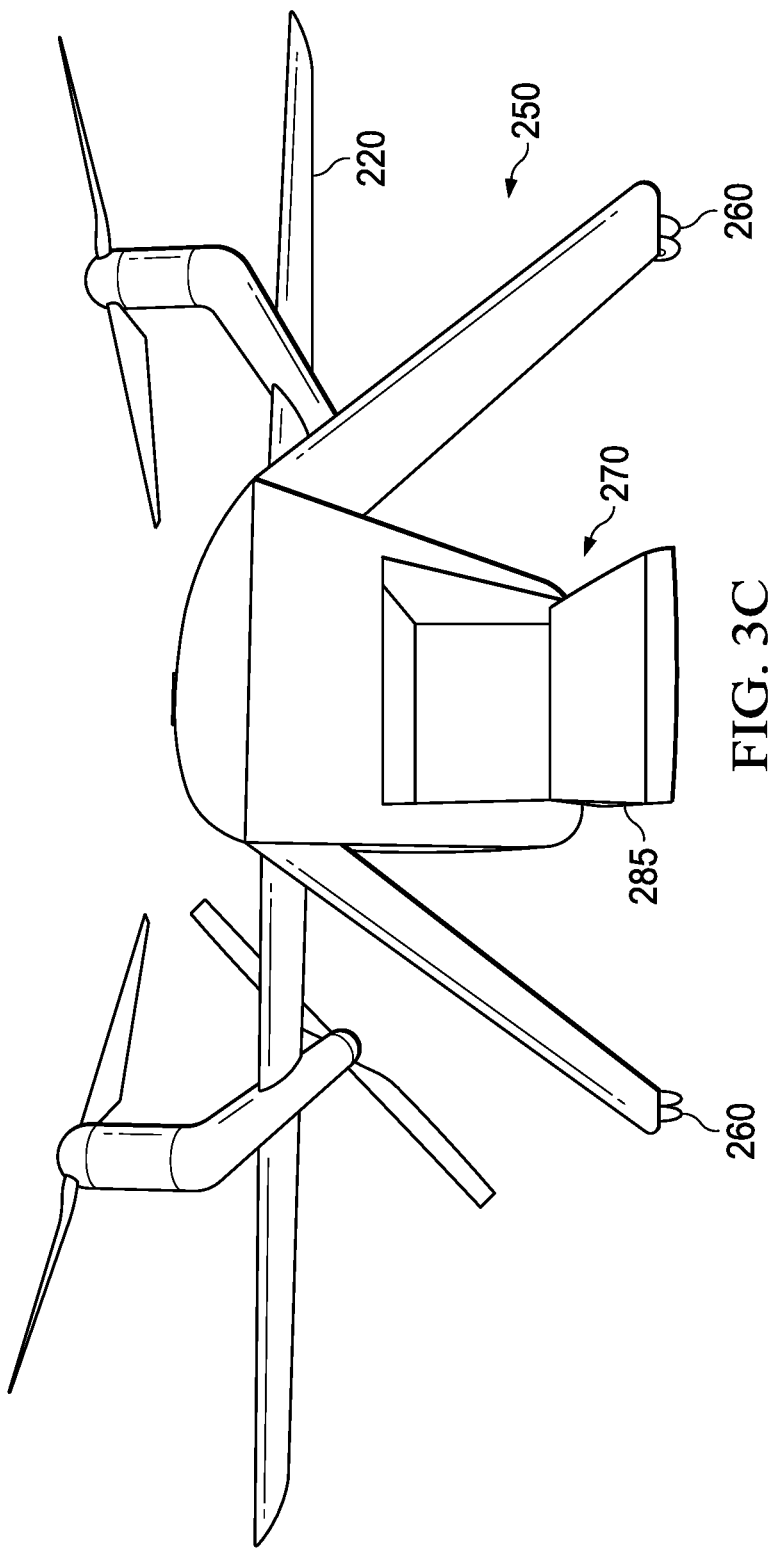

FIGS. 3A-3C show another embodiment of an aircraft under the present disclosure. Aircraft 200 comprises a fuselage 210, wing 220, booms 230, tilt rotors 240, fixed rotors 245, loading bay 270, and landing gear 260. In this embodiment, the empennage 250 comprises two downward pointing portions. This embodiment utilizes an aft loading bay 270 for loading and jettisoning from the rear of the aircraft 200. Loading bay 270 can utilize a bay door 285 that can be opened, locked, or released as desired. Landing gear 260 can be retractable and can be located near the nose of the aircraft, on the bottom of empennage 250, and elsewhere as needed. Fuselage 210 can house motors 260 and payload 270. In this embodiment motors 260 can be located above the payload 275. Other arrangements are possible depending on weight characteristics and needs.

Embodiments under the present disclosure have advantages over other tilt rotor aircraft and aircraft in general.

One benefit of the embodiments described herein is increased efficiency. Efficiency is always beneficial but is especially important in electric driven aircraft embodiments. Decreasing weight is one source of greater efficiency. Tilt rotors are heavier than fixed rotors. Some previous aircraft have disclosed tilt rotors both fore and aft of the wing. Embodiments described here, such as in FIGS. 1-2 and 3A-3C place fixed rotors aft of the wing and tilt rotors to the fore. This saves weight by having fewer tilt rotors. Having multiple rotors also allows each individual rotor to be lighter weight than fewer yet heavier rotors, giving overall weight savings. Using both fixed rotors and tilt rotors allows a portion of the hover thrust to be offloaded from the tilting rotors, which in turn allows them to be better sized for cruising flight. A belly-gap can also lead to lighter weight. Besides lighter weight, the use of fixed wings makes the described aircraft embodiments efficient during cruise. Another source of greater efficiency is greater pressure differential over the wings. In a preferred embodiment, the tilt rotors described are located fore of the wing. By placing the propulsion rotors fore of the wing, a greater pressure differential is achieved as air is directed over the wings, leading to greater lift. This can allow embodiments to utilize shorter runways than comparable aircraft. There are also disadvantages to aft propulsers. By residing in the fuselage wake, aft propulsers tend to be louder and less efficient.

Greater maneuverability and adaptability are other benefits of the current disclosure. Embodiments under the current disclosure can take off in different ways. The tilt rotors can be directed upward with the fixed rotors to provide vertical takeoff and landing. Tilt rotors can also be directed forward to takeoff or land using a long landing strip, similar to conventional winged aircraft. It is preferred that the rotor blades on the front tilt rotors be short enough to allow for takeoff and landing via strip.

The embodiments described herein can also provide better reliability and longer service life than other multi-tilt rotor aircraft. Fixed rotors are less complex than tilt rotors, meaning that parts wear out more slowly. By having fixed aft rotors instead of tilt aft rotors, the described embodiments can provide longer service life. In addition, because the fixed aft rotors can be stopped during cruise, the rotors and components will suffer less wear and tear.

Greater reliability and service life also contribute to greater safety. Multiple axes of thrust/lift can also lead to increased safety compared to aircraft with fewer axes. Multiple axes of thrust/lift allow for greater maneuverability, allowing described embodiments to adjust to varying winds, or other forces acting upon the aircraft. In cases where function of one rotor is lost, it may be possible to minimize any damage, injury or loss by using the remaining rotors to either continue flight or make as safe a landing or descent as possible. Embodiments under the current disclosure can also be used to deliver payloads, either in manned or unmanned configurations. Jettisoning a payload, or otherwise delivering a payload, can alter an aircraft's center of gravity during a flight or mission. Multiple rotors allow the described aircrafts to adjust to changing centers of gravity.

Engine configurations for the embodiments described can take a variety of forms. The configuration shown in FIG. 1 is turboelectric—a turbine engine drives a generator, which in turn powers four independent electric motors. Additional configurations which mechanically link a single engine to two rotors per side, or to the fore and aft rotors independently is also possible. Preferred embodiments comprise electric propulsion—it can be hard to implement transmissions for multiple rotors. But hybrid engines, all electric, gasoline engines, and other systems, or combinations of the foregoing, are all possible.

The efficiency advantages created by the embodiments described herein make such embodiments useful in the realm of drone (or manned) delivery systems. Such systems may need to be implemented in various parts of the world, and so the transporting of the aircraft(s) may be important.

Embodiments under the current disclosure include packable aircraft that can be broken down, packed into shipping containers, and reassembled upon delivery to an area where a delivery system is needed.

Figure 4A:
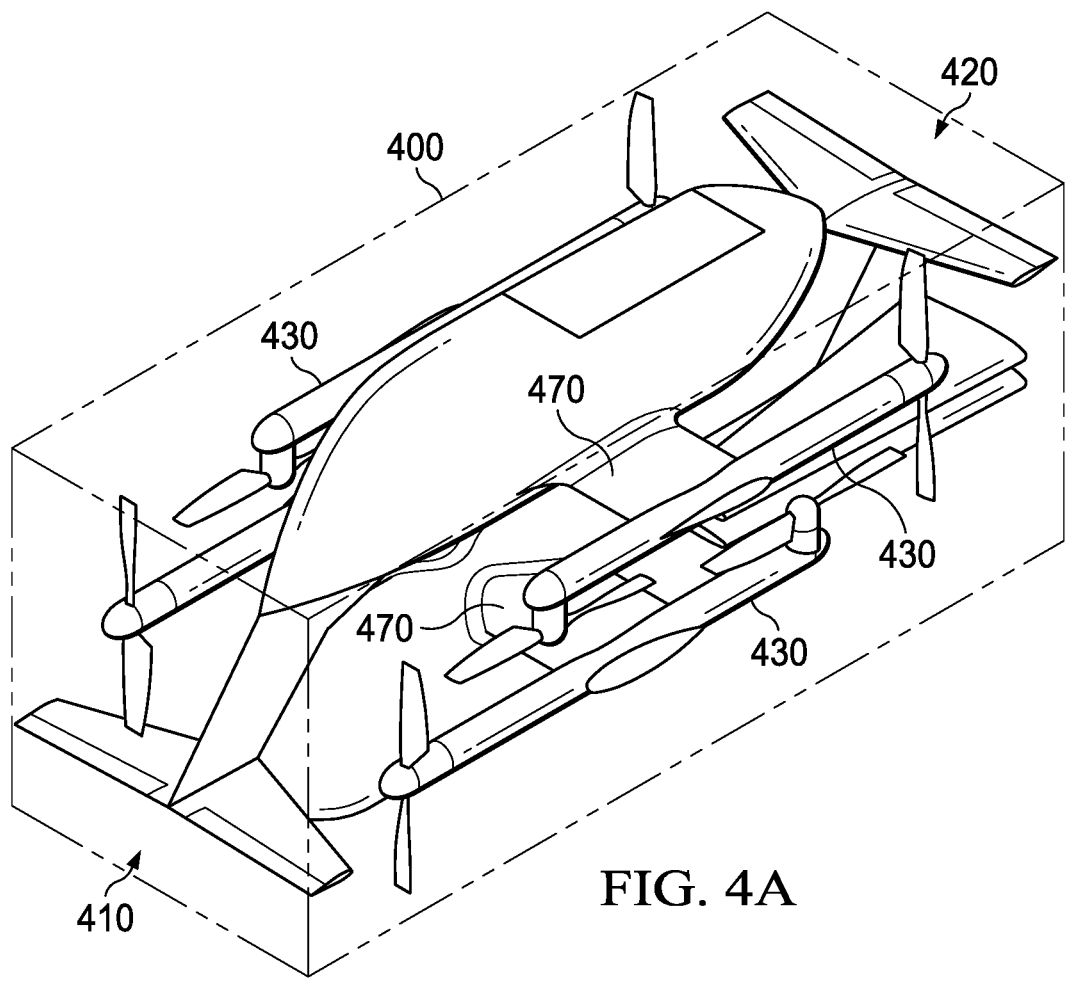
FIGS. 4A-4B are diagrams of an aircraft and container embodiment under the present disclosure.
Figure 4B:
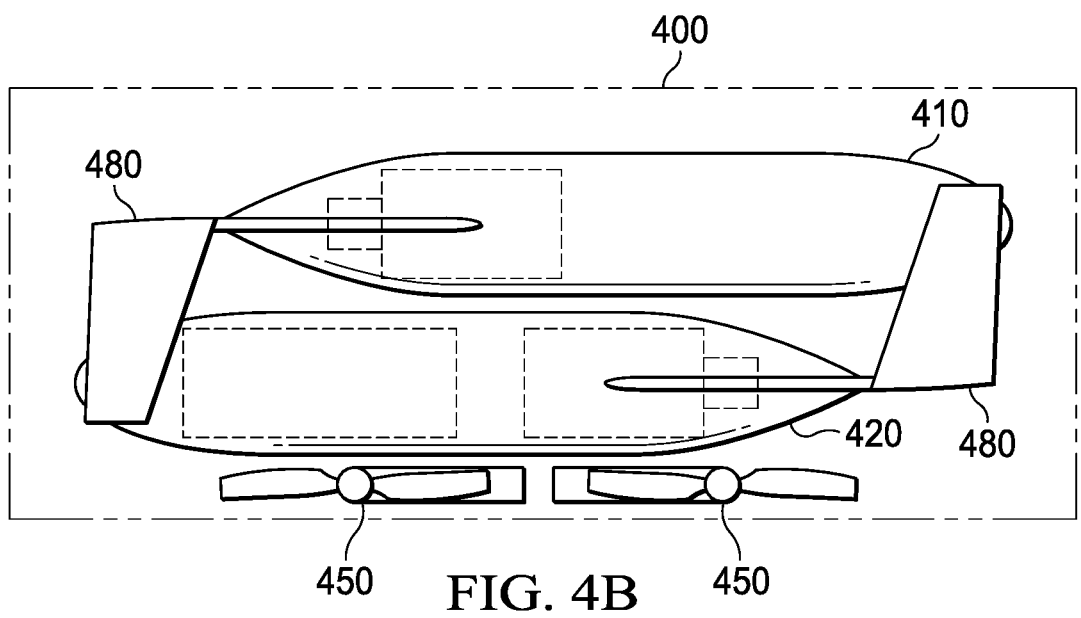

One embodiment of packable and stackable aircraft is shown in FIGS. 4A-4B. Shipping container 400 can comprise a 20-foot-long ISO (International Organization for Standardization) container, or another type of container. Container 400 can house two aircraft 410, 420. Aircraft 410, 420 can comprise the aircraft embodiment described in FIGS. 1-2. In this embodiment, the wings 470 can be detached outboard of the booms 430. FIG. 4A shows a perspective view and FIG. 4B shows a side view, with aircraft 410, 420 visible within container 400. In this embodiment, aircraft 410, 420 are packed shoebox style. Outboard portions 450 of the wings, detached at the booms, can be stored above or below the aircraft 410, 420. Container 400 can comprise ridges, levels, edges, tie downs, straps, foam packing, wheeled pallets, shelving, or other components for receiving aircraft 410, 420, holding them in place, or otherwise protecting them during transport. For the embodiment of FIGS. 4A-4B, it is preferable for the aircraft 410, 420 to separate outboard of the booms 430. This will keep the rotors attached to the fuselage. Due to the rotors' heavy weight, the aircraft will be more durable if these are not separable from the fuselage and/or wing. The outboard portion 450 of the wing will be lighter weight in comparison. Other embodiments are possible.

Figure 5A:
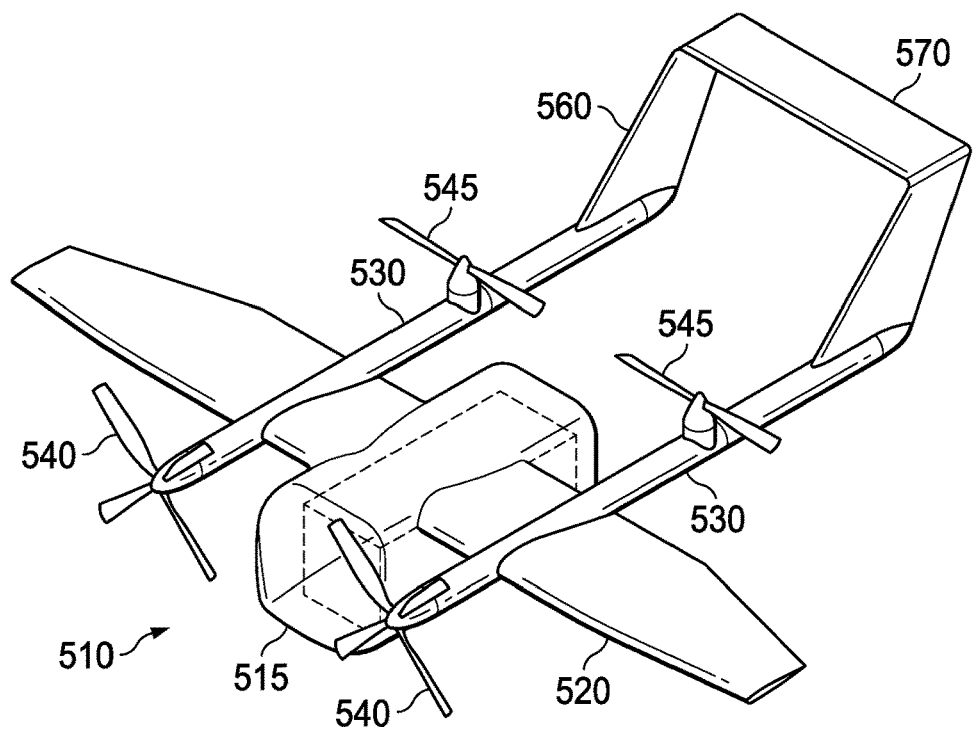
FIGS. 5A-5B are diagrams of an aircraft and container embodiment under the present disclosure.
Figure 5B:
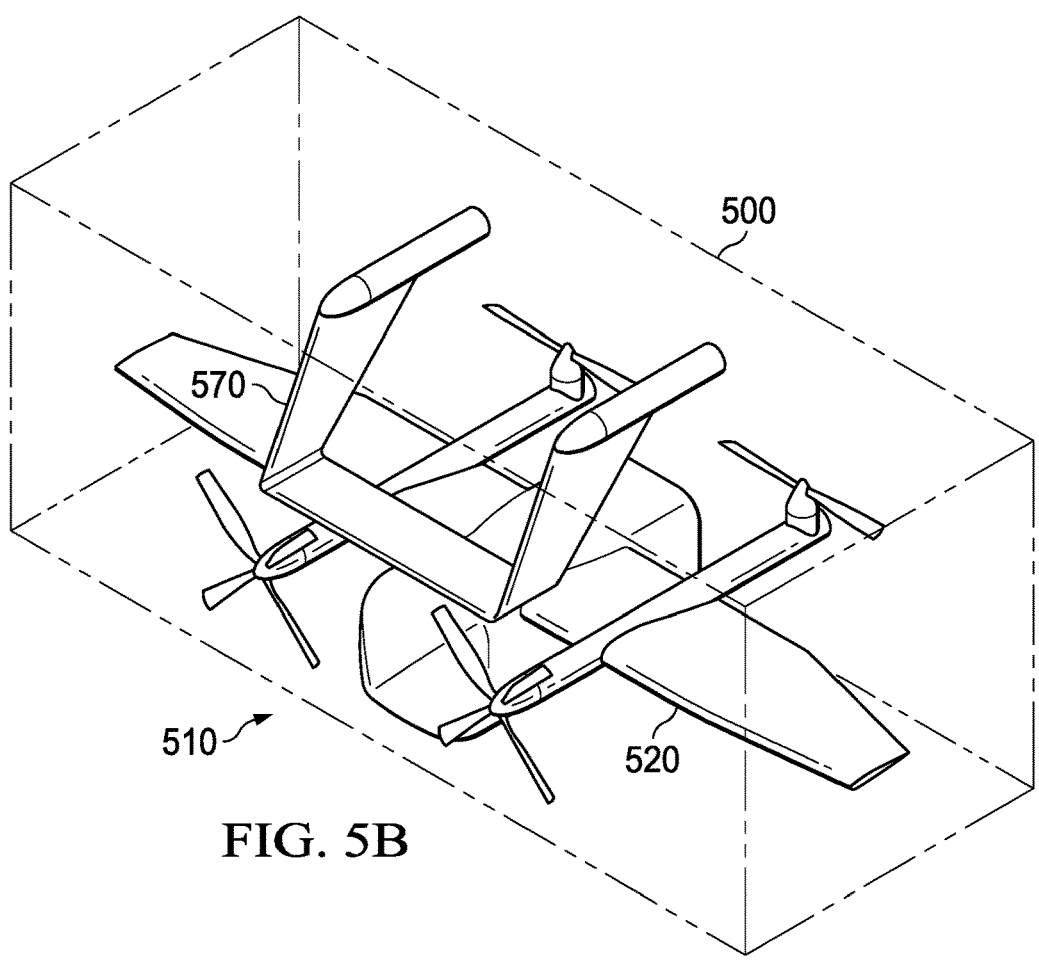

FIGS. 5A-5B show another embodiment of an aircraft and container system under the present disclosure. Aircraft 510 is similar to other aircraft embodiments described above, but with a bronco tail 570. Fuselage 515 connects to wing 520, tilt rotors 540, fixed rotors 545, and booms 530. Aircraft 510 can be separated aft of the fixed rotor (preferably) and stored within container 500 for transport. Tail 570 can be placed above fuselage 515 in container 500. Container 500 can comprise ridges, levels, edges, tie downs, straps, foam packing, wheeled pallets, shelving, or other components for receiving, holding and protecting aircraft 510.

FIGS. 4A-4B show a shoebox style storage. FIG. 5B shows a stacked style. Either style can be used with any aircraft embodiment.

Separation for storage is preferably outboard of the booms 430 in FIGS. 4A-4B and aft of the fixed rotor in FIGS. 5A-5B. Separation and attachment of wings, tails, or other components for storage can be achieved through male/female interlocking parts, locking clamps, bolts, screws, interference fit, locking pins, sauntering, welding, other appropriate attachment means, or combinations of any of the foregoing.

Figure 6A:
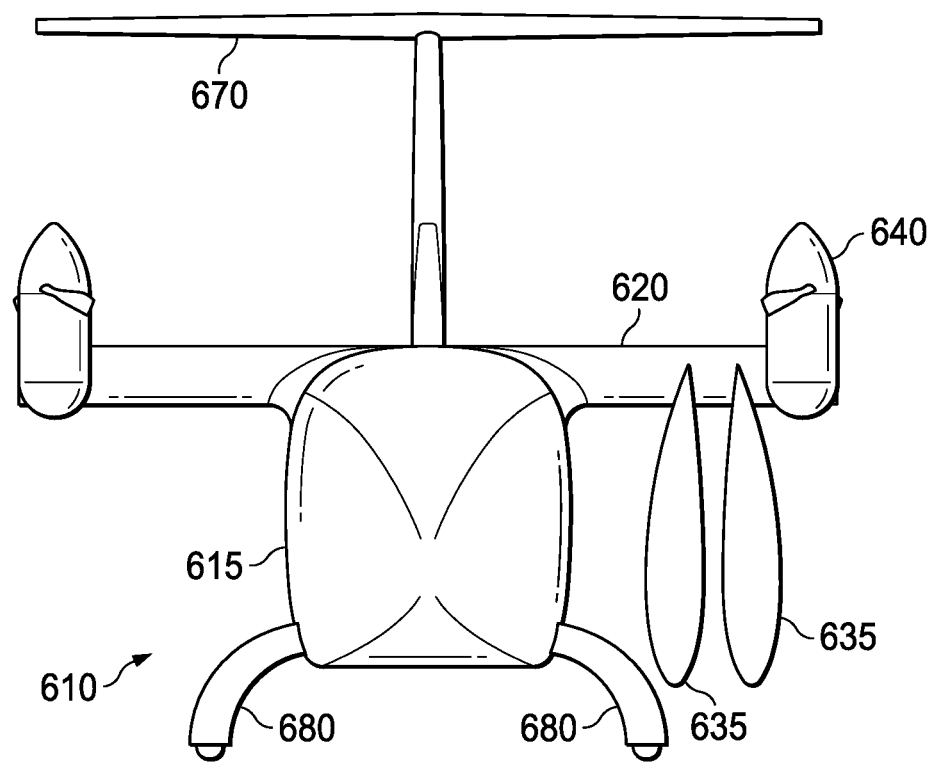
FIGS. 6A-6B are diagrams of an aircraft and container embodiment under the present disclosure.
Figure 6B:
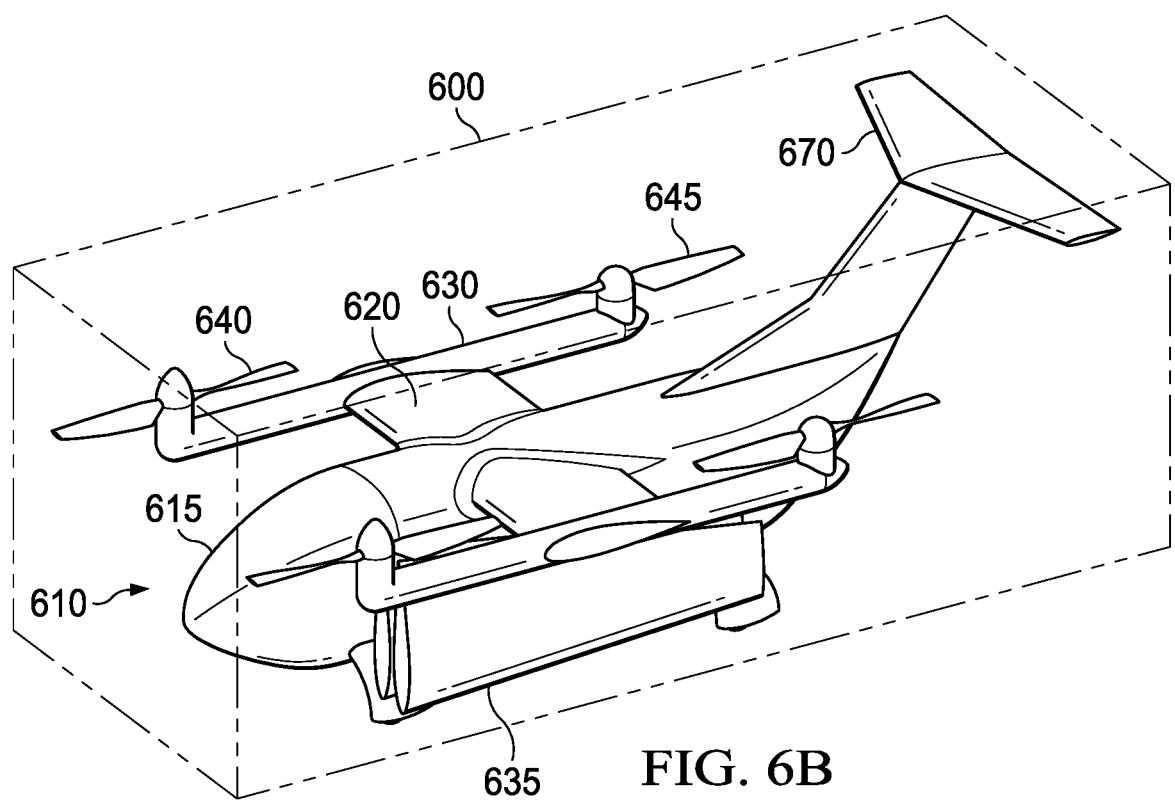

FIGS. 6A-6B show an embodiment of an aircraft 610 and shipping container 600 in a "one in" configuration—a container holding just one aircraft. Aircraft 610 comprises a fuselage 615, wing 620, tilt rotors 640, fixed rotors 645, landing gear 680, booms 630 and empennage 670. Outboard portions 635 of wing 620 can be detached outboard of the booms 630. The outboard portions can then be hung from hooks or other attachments on the bottom of wing 620. The entire aircraft 610 can then be stowed in shipping container 600. Shipping container 600 is preferably a 20-foot ISO shipping container. But other aircraft embodiments can be smaller, or larger, than aircraft 610 and a different sized container could be used. Tie downs, straps, bolts, hooks, ridges, shelving, or other appropriate attachment means can be used to hold, protect, lock and otherwise maintain aircraft 610 in shipping container 600.

Figure 7:
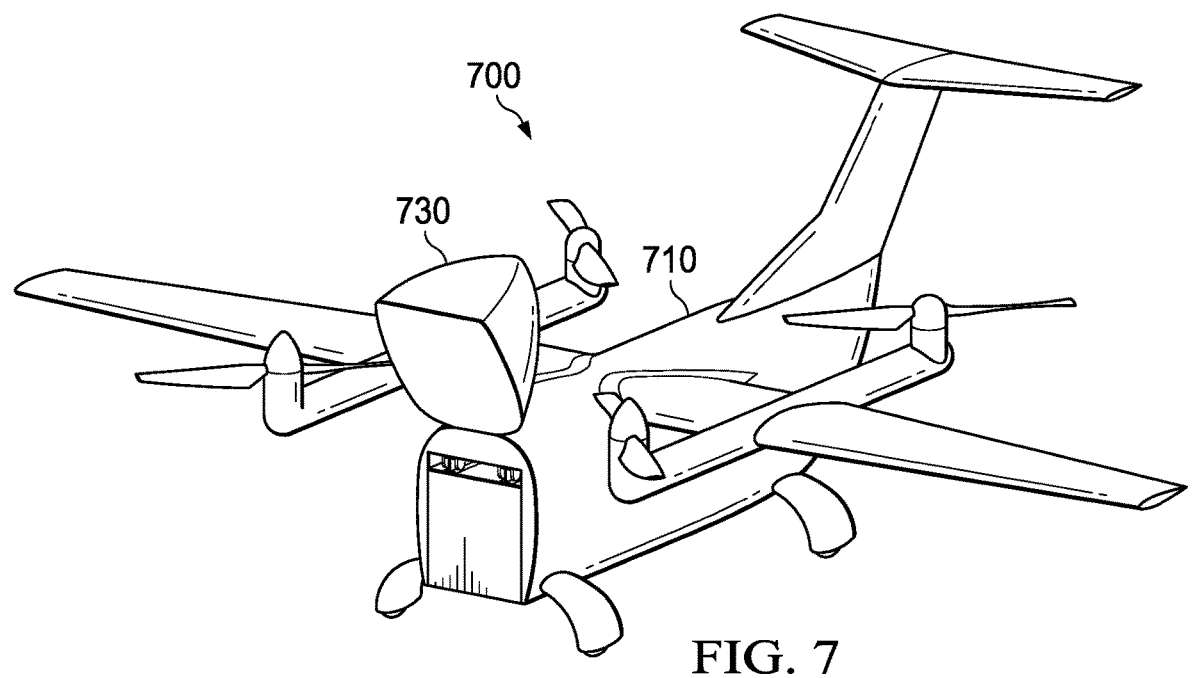
FIG. 7 is a diagram of an aircraft embodiment under the present disclosure.
Figure 8:
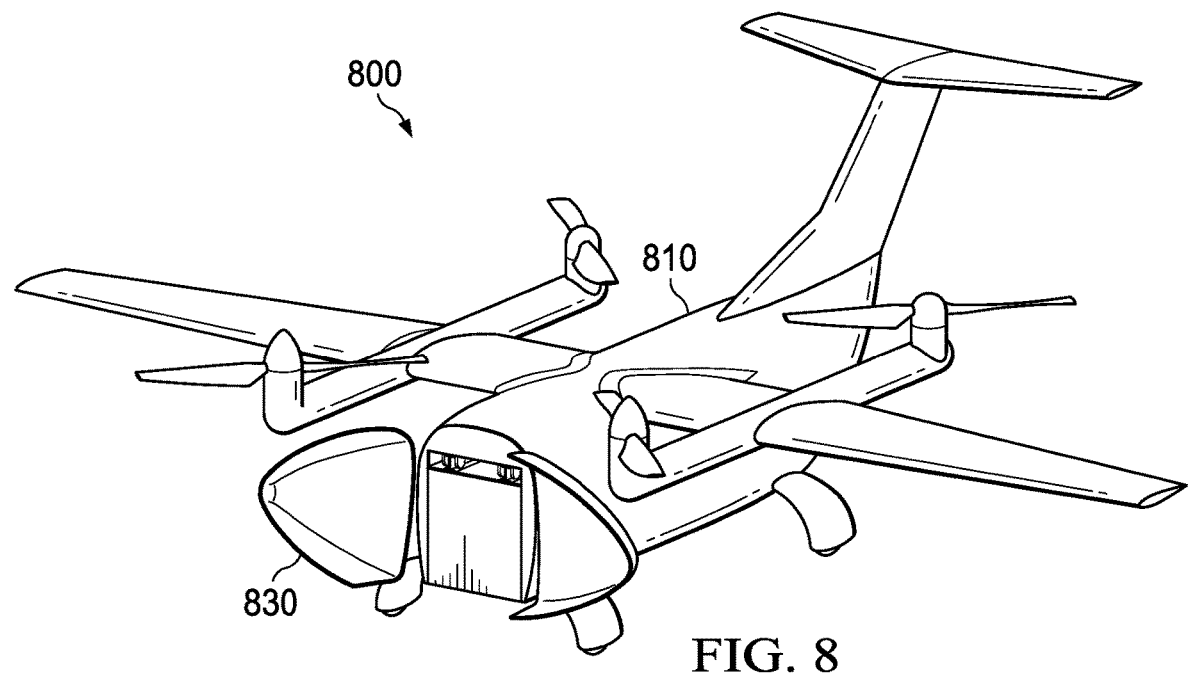
FIG. 8 is a diagram of an aircraft embodiment under the present disclosure.

FIGS. 7 and 8 shows alternative embodiments of aircraft under the present disclosure with loading bays through the front of the aircraft. In FIG. 7, aircraft 700 has a fuselage 710 and a flip-up nose 730 at the front of the fuselage. In FIG. 8, aircraft 800 has a fuselage 810 and a clamshell nose 830. Other types of access to the front of the fuselage are possible as well.

Figure 9A:
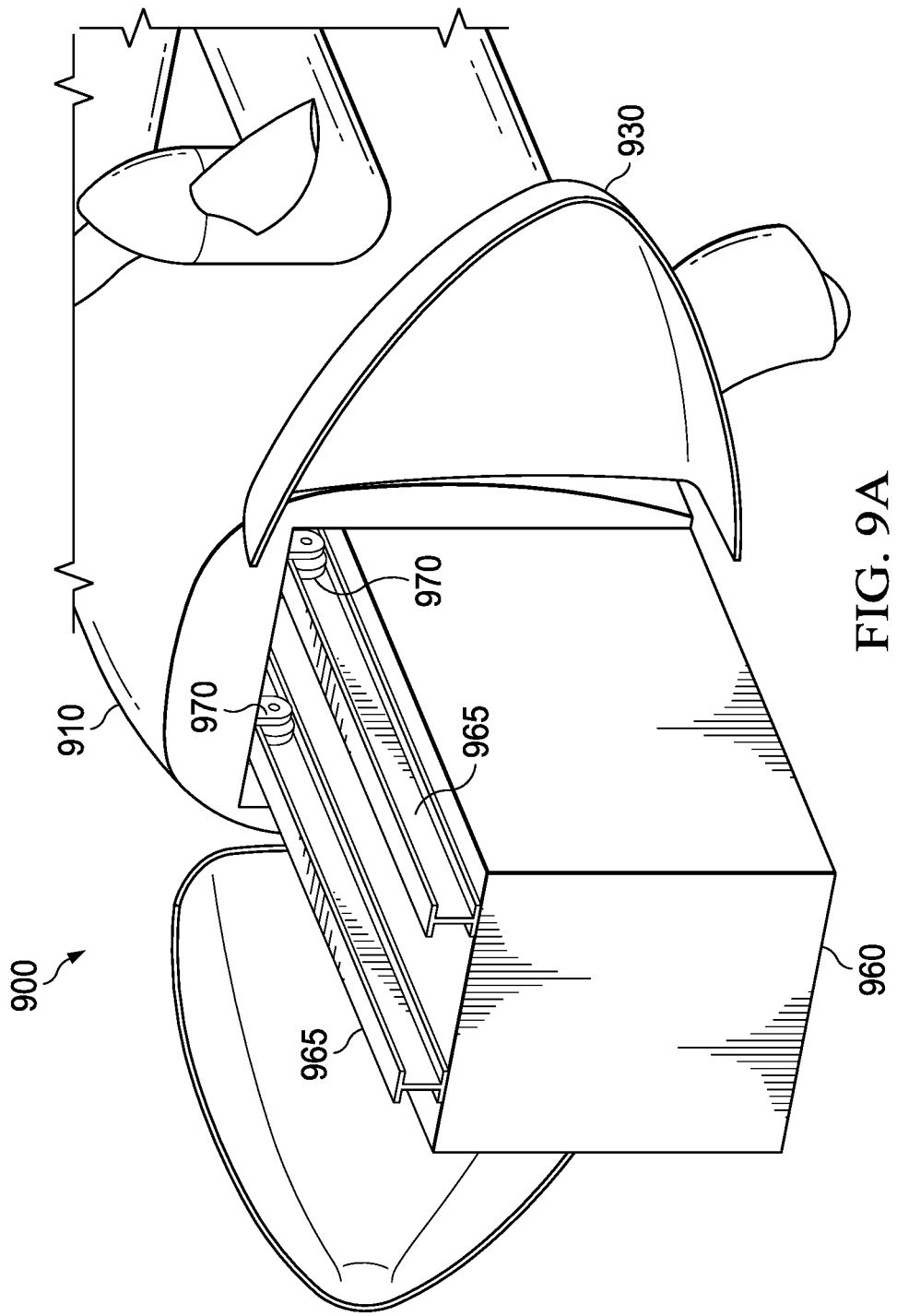
FIGS. 9A-9C are diagrams of an aircraft and container embodiment under the present disclosure.
Figure 9B:
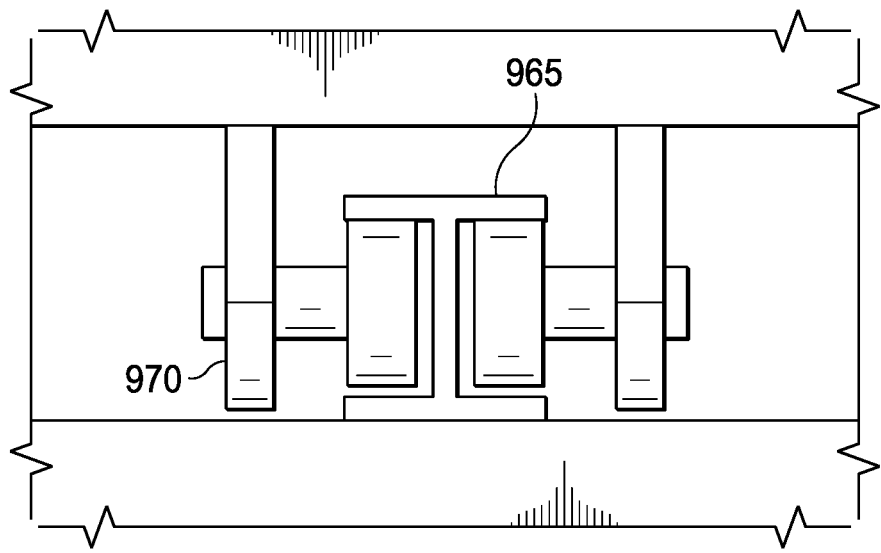
Figure 9C:
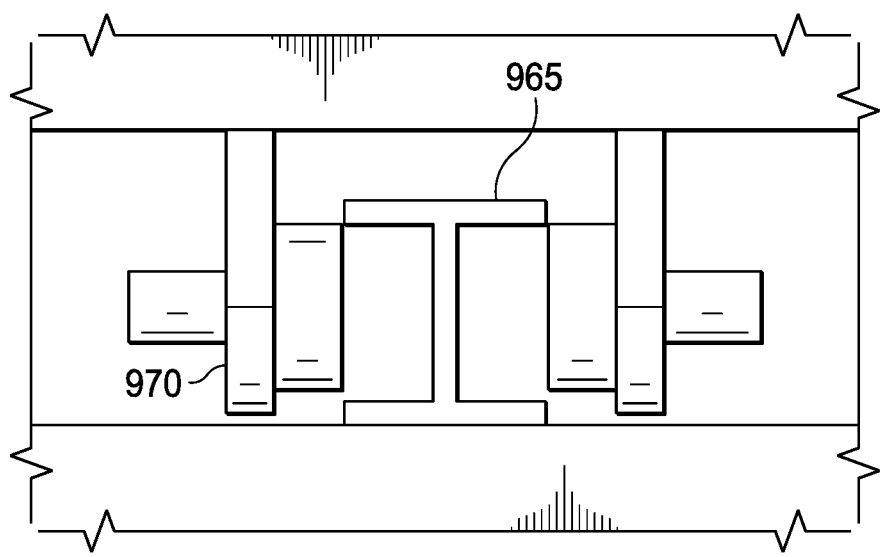

FIGS. 9A-9C show one possible payload attachment mechanism under the present disclosure. Aircraft 900 comprises a fuselage 910 and a clamshell nose 930. Payload 960 can be loaded onto, and held by, the aircraft 900 via roller mounts 970 attached to an interior surface of the fuselage 910. Rails 965, attached to payload 960, can slide onto roller mounts 970. Roller mounts 970 can be retractable. Upon being retracted, see FIG. 9C, the payload can be jettisoned. Jettisoned payload 960 can be dropped through the belly-gap described above, or through similar opening(s). Other attachment and jettison means, besides that shown in FIGS. 9A-9C, are possible.

Figure 10:
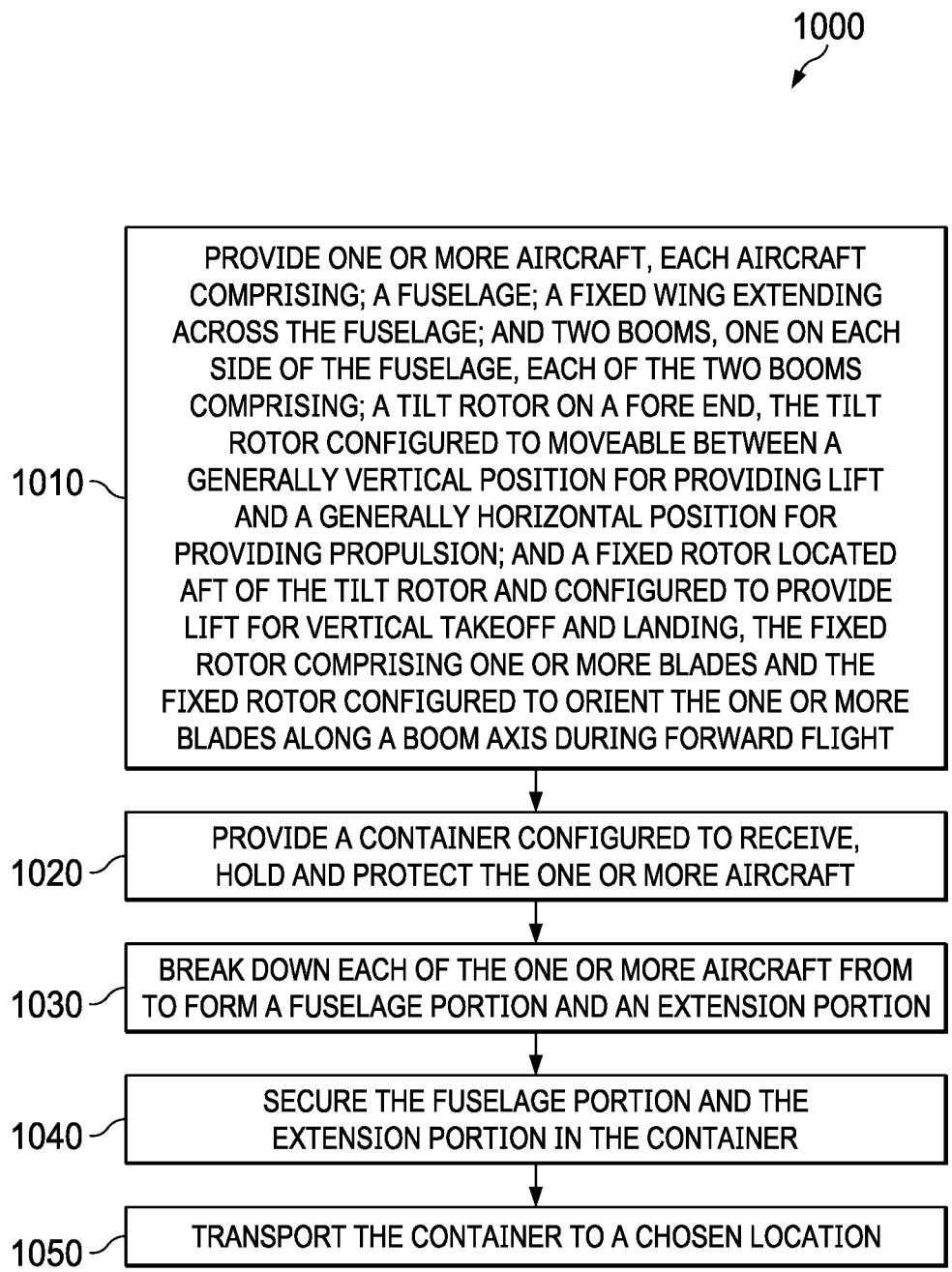
FIG. 10 is a diagram of a method embodiment under the present disclosure.

A method embodiment 1000 for transporting aircraft under the current disclosure is shown in FIG. 10. Step 1010 is to provide one or more aircraft, each aircraft comprising; a fuselage; a fixed wing extending across the fuselage; and two booms, one on each side of the fuselage, each of the two booms comprising; a tilt rotor on a fore end, the tilt rotor configured to be moveable between a generally vertical position for providing lift and a generally horizontal position for providing propulsion; and a fixed rotor located aft of the tilt rotor and configured to provide lift for vertical takeoff and landing, the fixed rotor comprising one or more blades and the fixed rotor configured to orient the one or more blades along a boom axis during forward flight. Step 1020 is to provide a container configured to receive, hold and protect the one or more aircraft. Step 1030 is to break down each of the one or more aircraft to form a fuselage portion and an extension portion. Step 1040 is to secure the fuselage portion and the extension portion in the container. Step 1050 is to transport the container to a chosen location. The aircraft can also be reassembled at the destination and then used for cargo and payload delivery systems.

Figure 11:
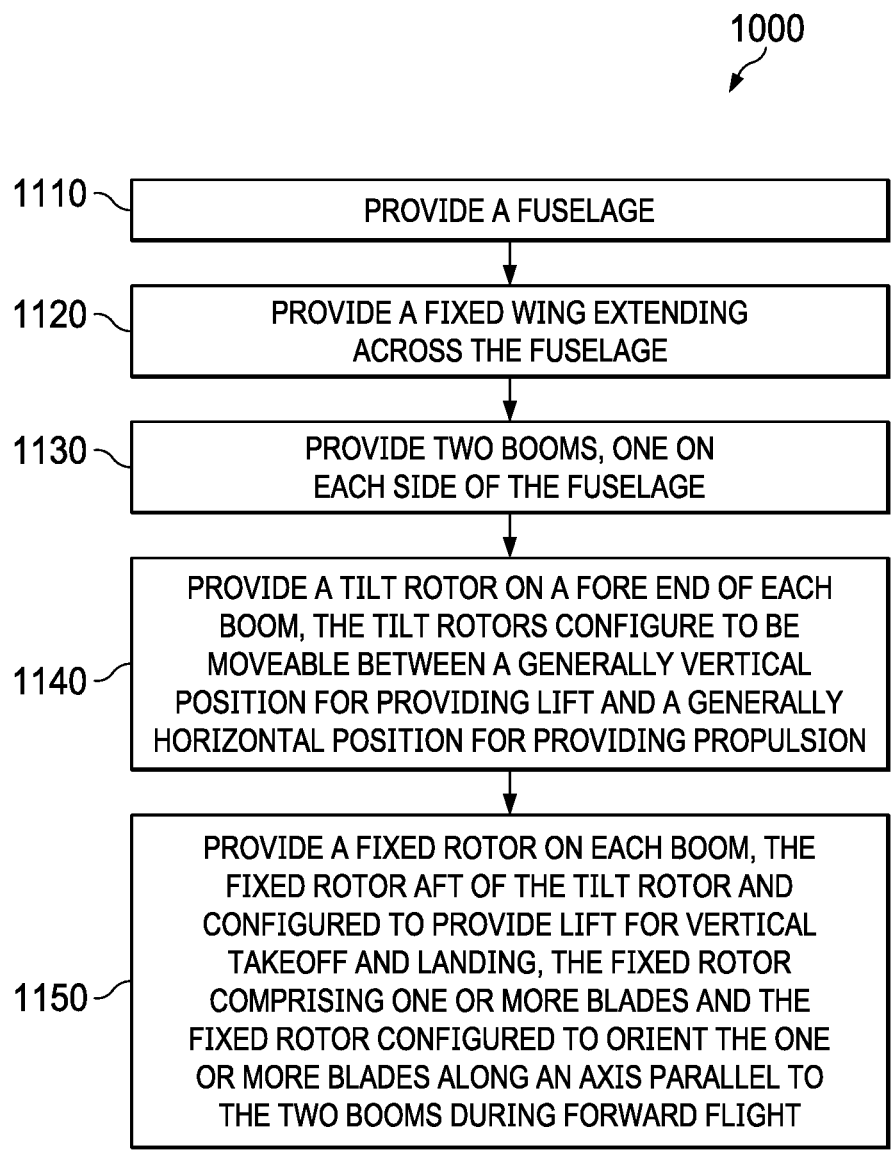
FIG. 11 is a diagram of a method embodiment under the present disclosure.

FIG. 11 shows an embodiment of a method of manufacture 1100 for an aircraft under the current disclosure. Step 1110 is to provide a fuselage. Step 1120 is to provide a fixed wing extending across the fuselage. Step 1130 is to provide two booms, one on each side of the fuselage. Step 1140 is to provide a tilt rotor on a fore end of each boom, the tilt rotors configured to be moveable between a generally vertical position for providing lift and a generally horizontal position for providing propulsion. Step 1150 is to provide a fixed rotor on each boom, the fixed rotor aft of the tilt rotor and configured to provide lift for vertical takeoff and landing, the fixed rotor comprising one or more blades and the fixed rotor configured to orient the one or more blades along an axis parallel to the two booms during forward flight.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aircraft comprising:
   a fuselage;
   a fixed wing extending across the fuselage; and
   two booms, one on each side of the fuselage, each of the two booms comprising;
   a tilt rotor on a fore end, the tilt rotor configured to be moveable between a generally vertical position for providing lift and a generally horizontal position for providing propulsion; and
   a fixed rotor aft of the tilt rotor and configured to provide lift for vertical takeoff and landing, the fixed rotor comprising one or more blades and the fixed rotor configured to orient the one or more blades along an axis parallel to the two booms during forward flight;
   wherein outboard portions of the fixed wing that are outboard of the two booms are configured to be separable from the rest of the aircraft for transport, the fixed wing being further configured to attach the outboard portions to an underside of the fixed wing for transport.

2. The aircraft of claim 1, further comprising a belly-gap underneath the fuselage, the aircraft configured to receive and jettison a payload through the belly-gap.

3. The aircraft of claim 1, further comprising a T-tail empennage.

4. The aircraft of claim 1, wherein the aircraft is configured to be flown remotely or autonomously.

5. The aircraft of claim 2, further comprising a retractable curtain configured to be deployed across the belly-gap.

6. The aircraft of claim 1 further comprising a flip-up nose.

7. The aircraft of claim 1 further comprising a clam-shell nose, wherein the clam-shell nose is configured to split in half and open horizontally to expose an entire circumference of the fuselage for access to a payload.

8. The aircraft of claim 1, further comprising an empennage comprising two downward pointing portions, each of the two downward pointing portions comprising landing gear on a bottom edge.

9. A system for transporting aircraft, comprising:
   two aircrafts, each aircraft comprising;
   a fuselage;
   a fixed wing extending across the fuselage; and
   two booms, one on each side of the fuselage, each of the two booms comprising;
   a tilt rotor on a fore end, the tilt rotor configured to be moveable between a generally vertical position for providing lift and a generally horizontal position for providing propulsion; and
   a fixed rotor located aft of the tilt rotor and configured to provide lift for vertical takeoff and landing, the fixed rotor comprising one or more blades and the fixed rotor configured to orient the one or more blades along a boom axis during forward flight; and
   a container configured to receive the two aircraft and to hold the two aircraft in place during transport;
   wherein the container is configured to receive and hold apart the two aircraft in a shoebox orientation such that the fuselage of one aircraft is placed upside down over the fuselage of the other aircraft and an aft portion of one aircraft is proximate a fore portion of the other aircraft.

10. The system of claim 9, wherein the container is configured to be stackable with other similar containers.

11. The system of claim 9, wherein the container comprises 20-foot long International Organization for Standardization (ISO) container.

12. The system of claim 9, wherein the fixed wing comprises an outboard portion configured to be separated outboard of the two booms.

13. The system of claim 9, wherein the two booms are joined at an aft end by a tail empennage, and wherein the tail empennage is configured to be separable from the rest of the aircraft and stored in the container for transport.

14. The system of claim 13 wherein the tail empennage is separable aft of the fixed rotor.

15. The system of claim 9 wherein the container further comprises tie downs that are configured to hold the one or more aircraft in place.

* * * * *